(12) United States Patent
Hoglund et al.

(10) Patent No.: US 6,747,984 B1
(45) Date of Patent: Jun. 8, 2004

(54) METHOD AND APPARATUS FOR TRANSMITTING DATA

(75) Inventors: Timothy E. Hoglund, Colorado Springs, CO (US); Stephen M. Johnson, Colorado Springs, CO (US); David M. Weber, Monument, CO (US); John M. Adams, Colorado Springs, CO (US); Mark A. Reber, Alpharetta, GA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/216,401

(22) Filed: Dec. 18, 1998

(51) Int. Cl.[7] ................. H04L 12/54; H04L 12/28; G06F 15/167; G01R 31/08
(52) U.S. Cl. ................. 370/428; 370/400; 370/412; 370/231; 709/215
(58) Field of Search ................. 370/386, 428, 370/389, 400, 230, 235, 237, 236, 398, 412, 413, 410, 360, 424, 426, 429, 217, 218, 219, 220, 221, 222, 223, 224, 225; 709/225, 227, 237; 710/39, 40, 48

(56) References Cited

U.S. PATENT DOCUMENTS

| | | | | |
|---|---|---|---|---|
| 4,849,968 A | | 7/1989 | Turner ..................... 370/94 |
| 4,928,096 A | * | 5/1990 | Leonardo et al. ........... 370/346 |
| 5,014,265 A | * | 5/1991 | Hahne et al. ............. 370/236 |
| 5,136,582 A | | 8/1992 | Firoozmand ............. 370/85.1 |
| 5,247,626 A | | 9/1993 | Firoozmand ............. 395/250 |
| 5,276,703 A | * | 1/1994 | Budin et al. ............. 370/452 |
| 5,311,583 A | * | 5/1994 | Friedes et al. ............ 379/209 |
| 5,379,292 A | * | 1/1995 | Kurata et al. ............ 370/235 |
| 5,440,558 A | * | 8/1995 | Ban .................... 709/227 |
| 5,463,382 A | * | 10/1995 | Nikas et al. ............. 370/428 |
| 5,610,745 A | | 3/1997 | Bennett ................. 359/139 |
| 5,613,067 A | * | 3/1997 | Brady et al. ............. 709/225 |
| 5,615,392 A | | 3/1997 | Harrison et al. .......... 395/876 |
| 5,644,575 A | * | 7/1997 | McDaniel ............... 370/416 |
| 5,726,977 A | | 3/1998 | Lee |
| 5,742,675 A | * | 4/1998 | Kilander et al. .......... 379/265 |
| 5,768,530 A | | 6/1998 | Sandorfi ................ 395/200 |
| 5,784,358 A | | 7/1998 | Smith et al. |
| 5,856,972 A | * | 1/1999 | Riley et al. ............. 370/389 |
| 5,864,557 A | * | 1/1999 | Lyons .................. 370/400 |
| 5,914,936 A | | 6/1999 | Hatono et al. |
| 5,914,955 A | * | 6/1999 | Rostoker et al. .......... 370/428 |
| 5,963,540 A | * | 10/1999 | Bhaskaran .............. 370/218 |
| 6,000,020 A | * | 12/1999 | Chin et al. ............. 370/403 |
| 6,031,819 A | * | 2/2000 | Croslin ................ 370/217 |
| 6,038,235 A | * | 3/2000 | Ho et al. .............. 370/462 |
| 6,091,710 A | * | 7/2000 | Mawhinney ............ 370/236 |
| 6,098,125 A | * | 8/2000 | Fiacco et al. ............ 710/52 |
| 6,101,166 A | * | 8/2000 | Baldwin et al. .......... 370/222 |
| 6,104,722 A | * | 8/2000 | Stewart ............... 370/438 |
| 6,118,772 A | * | 9/2000 | Giordano et al. ......... 370/328 |
| 6,128,283 A | * | 10/2000 | Sabaa et al. ............ 370/236 |
| 6,185,203 B1 | * | 2/2001 | Berman ................ 370/351 |
| 6,188,668 B1 | * | 2/2001 | Brewer et al. ........... 370/222 |
| 6,256,306 B1 | * | 7/2001 | Bellenger ............. 370/389 |
| 6,377,374 B1 | * | 4/2002 | Davis et al. ............ 359/128 |
| 6,393,023 B1 | * | 5/2002 | Shimizu et al. .......... 370/389 |
| 6,570,853 B1 | * | 5/2003 | Johnson et al. .......... 370/236 |

* cited by examiner

*Primary Examiner*—Hanh Nguyen
(74) *Attorney, Agent, or Firm*—Carstens, Yee & Cahoon, LLP (57) ABSTRACT

A method and apparatus for transmitting data in a node having a buffer. A first set of data is received in a buffer for transmission to a target node. The first set of data is sent to the target node. Responsive to an indication that the target node is unable to receive data, a second set of data is loaded into the buffer for transmission to another target node, while the first set of data is retained in the buffer.

12 Claims, 5 Drawing Sheets

METHOD AND APPARATUS FOR TRANSMITTING DATA

BACKGROUND OF THE INVENTION

1. Technical Field

The present invention relates to an improved data processing system and in particular to a method and apparatus for transmitting data. Still more particularly, the present invention relates to a method and apparatus for managing transmission of data from a source to a destination.

2. Description of the Related Art

Two basic types of communications connections are employed between processors and between a processor and a peripheral. These types of connections are known as channels and networks. A channel provides a direct or switched point-to-point connection between communicating devices. This type of connection is typically employed between a processor and a peripheral device. The primary task of the channel is to transport data at the highest possible speed with the least delay. In contrast, a network is an aggregation of distributed nodes, such as workstations, file servers, and peripherals. Typically, in a network a node contends for the transmission medium and each node must be kept free of error conditions on the network. A traditional channel is hardware intensive and typically has lower overhead than a network. Conversely, networks tend to have relatively high overhead because they are software intensive. Networks, however, are expected to handle a more extensive range of tasks as compared to channels. In a closed system, every device addressed is known to the operating system either by assignment or pre-definition. This configuration knowledge is important to the performance levels of channels. Fibre Channel is a channel-network hybrid containing network features to provide the needed connectivity, distance, and protocol multiplexing along with enough traditional channel features to retain simplicity, repeatable performance, and guaranteed delivery. Fibre Channel has an architecture that represents a true channel/network integration. Fibre Channel allows for an active intelligent interconnections scheme, called a fabric, to connect devices. A Fibre Channel port manages simple point-to-point connection between itself and the fabric. A "port" is a hardware entity on a "node" with a node being a device connected to a network that is capable of communicating with other network devices. Transmission is isolated from control protocol. As a result, different topologies may be implemented. Fibre Channel supports both large and small data transfers.

The demand for flexible, high performance, fault-tolerant storage subsystems caused host adapter, disk storage, and high-capacity drive manufacturers to adopt Fibre Channel (FC) as a standard. This serial standard cuts cabling costs, increases data rates, and overcomes distance limitations commonly associated with a Small Computer System Interface (SCSI). Fibre Channel can carry SCSI protocols, and as a result offers an ideal upgrade for work stations, servers, and other systems requiring high availability and/or high bandwidth. Fibre Channel has become increasingly important as companies are seeking to provide faster and easier access to data for various clients. The Fibre Channel Standard (FCS) as adopted by the American National Standards Institute (ANSI), provides a low cost, high speed interconnect standard for workstations, mass storage devices, printers, and displays.

Current Fibre Channel data transfer rates exceed 100 megabytes (Mbytes) per second in each direction. Fibre Channel data transfer rates also may be scaled to lower speed, such as 50 Mbytes per second and 25 Mbytes per second. This technology provides an interface that supports both channel and network connections for both switched and shared mediums. Fibre Channel simplifies device interconnections and reduces hardware cost because each device requires only a single Fibre Channel port for both channel and network interfaces. Network, port to port, and peripheral interfaces can be accessed though the same hardware connection with the transfer of data of any format.

In sending data from a source node to a destination node, the source transmits data from a bus, such as a Peripheral Component Interconnect (PCI) bus, to a buffer for transfer onto a Fibre Channel system, which is connected to the destination node. Data is sent serially on Fibre Channel systems. As a result, data currently in a buffer must be sent before additional data may be loaded. Currently, if data cannot be sent because the destination is not accepting additional data, then this data must be removed to send data to another destination. This loading and dumping of data increases the overhead in transferring data between various nodes on a Fibre Channel system. Thus, it would be advantageous to have an improved method and apparatus for transferring data between nodes in which the overhead of acquiring the dumping and reloading of new data is eliminated.

SUMMARY OF THE INVENTION

The present invention provides a method and apparatus for transmitting data in a node having a buffer. A first set of data is received in a buffer for transmission to a target node. The first set of data is sent to the target node. Responsive to an indication that the target node is unable to receive data, a second set of data is loaded into the buffer for transmission to another target node, while the first set of data is retained in the buffer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
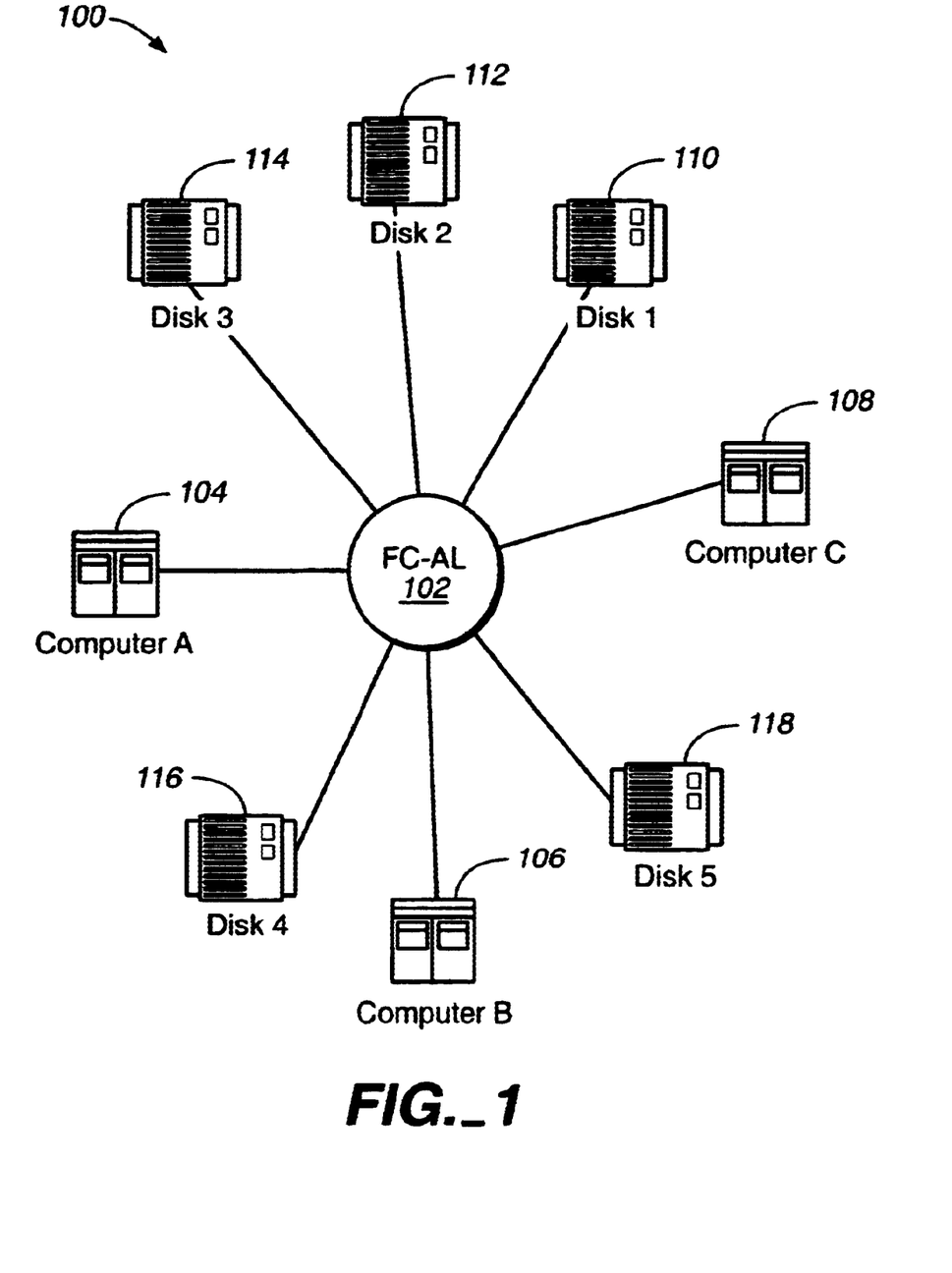
FIG. 1 is a diagram of a data processing system in which a preferred embodiment of the present invention may be implemented.

With reference now to FIG. 1, a diagram of a data processing system is illustrated in which a preferred embodiment of the present invention may be implemented. Data processing system 100 incorporates a network on the form of a Fibre Channel fabric 102. In this example, Fibre Channel 102 is a Fibre Channel arbitrated loop (FC-AL). Although the depicted example involves a fabric in the form of an arbitrated loop, the present invention may be applied to other fabrics, such as, for example, a point-to-point or switched fabric. In a point-to-point fabric, if blocking occurs, nothing else can be done. With a switched fabric, the process and decision making are the same, but the events that will cause the blocking indication are different.

Still with reference to FIG. 1, computer 104, computer 106, and computer 108 are connected to fabric 102. In addition, disk storage unit 110, disk storage unit 112, disk storage unit 114, disk storage unit 116, and disk storage unit 118 also are connected fabric 102. The various computers, computers 104–108, may access data located on the various disk storage units, disk storage units 110–118. Of course, other devices in computers may be connected to fabric 102 depending on the implementation. In this topology, a node, such as computer 108 may send data to a target node such as computer 104 or disk storage unit 116. Typically, computer 108, as the source node, will place data in a buffer for transmission to a target node. If the target node is not accepting data, an indication will be received at computer 108 that the transfer has been blocked by the target node. In this instance, the shared fabric resources (source node) may be held idle waiting for the target to indicate that it will accept data or the transfer will be aborted with the data being dumped or cleared to make way for another transfer to another node. At a later time, computer 108 may again try sending data to the target node by reloading the data and attempting to retransmit the data to the target node. A Fibre Channel arbitrated loop topology as shown for Fibre Channel fabric 102 allows for multiple communicating ports to be attached in a loop without requiring hubs or switches. The loop is a shared-bandwidth distributed topology where each port includes the minimum necessary connection function. A port may arbitrate or use an arbitrated loop. Once a port wins the arbitration, based on the lowest port address, a second port may be opened to complete a single bi-directional point-to-point circuit. With the loop, only one pair of ports may communicate at one time. When two connected ports release control of the loop, another point-to-point circuit may be established between two ports. FIG. 1 is intended as an example of a distributed data processing system in which the processes and apparatus of the present invention may be implemented, and not as an architectural limitation for the present invention.

The present invention provides a mechanism that avoids this situation by retaining the data within the buffer while new data is loaded into another buffer for transfer to another target node. Further, multiple sets of data may be loaded into buffers using the mechanism of the present invention. Fibre Channel fabric 102 is scanned for a node that will accept data. The scanning may be performed in a number of different ways, such as, for example, attempting transmission to nodes in an ordered list or using a round robin scheme, which is a sequential, cyclical selection of target nodes.

Figure 2:
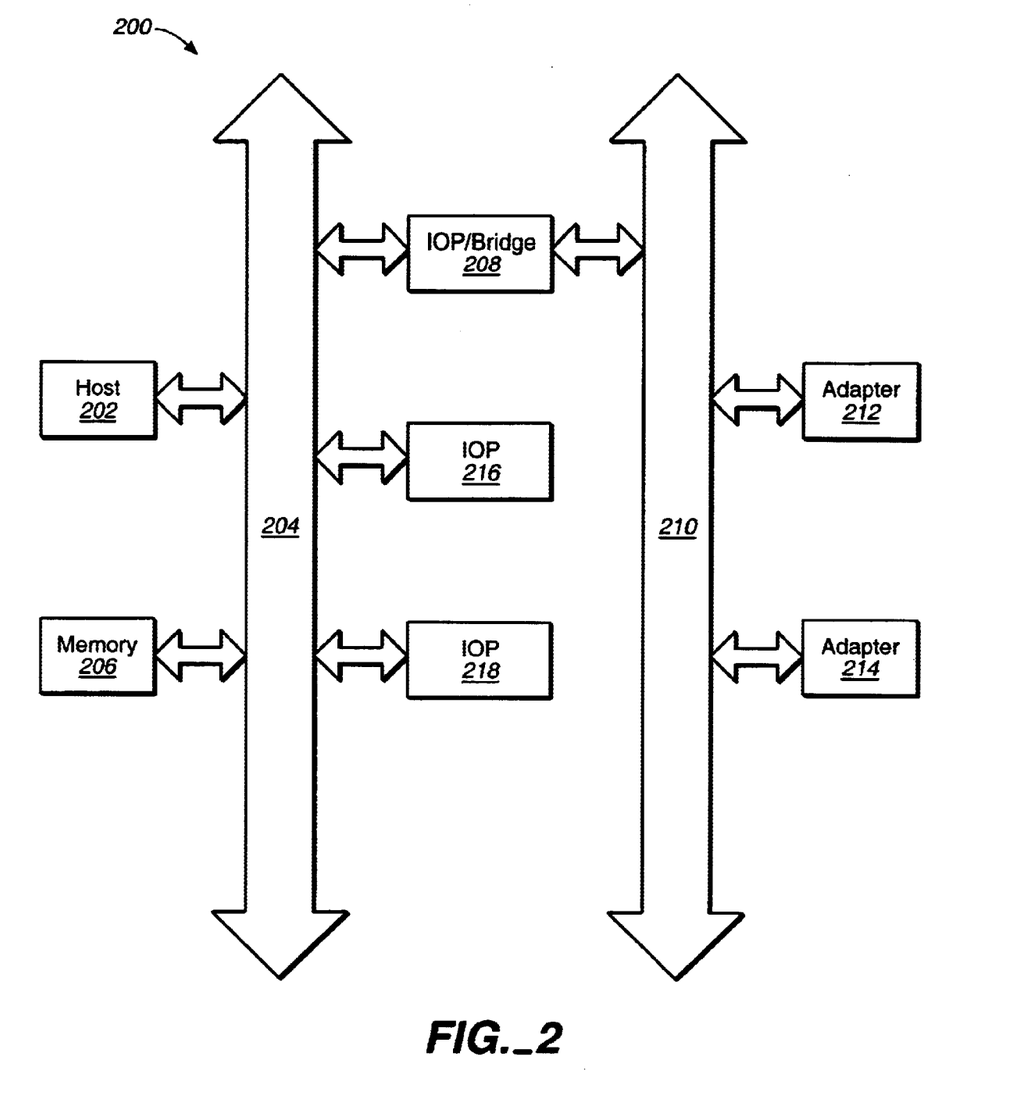
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 includes a host 202, which may contain one or more processors, which form the central processing unit (CPU) or CPUs for data processing system 200. Data processing system 200 is a data processing system designed along the Intelligent Input/Output ($I_2O$) Architecture Specification, version 1.5, March 1997 available from the $I_2O$ Special Interest Group. The present invention, however, may be implemented using other system architectures.

The processors within host 202 may be, for example, a Pentium II processor operating at 400 Mhz, which is available from Intel Corporation in Santa Clara, Calif. In the depicted example, primary bus 204 and secondary bus 210 are PCI buses although the present invention may be implemented using other types of buses.

Still referring to FIG. 2, data processing system 200 includes a primary input/output platform (IOP) 208, which is connected to host 202 by primary bus 204. In data processing system 200, memory 206 is attached to primary bus 204. Additionally, IOP 208 is connected to secondary bus 210 and also functions as a PCI-to-PCI bus bridge. Data processing system 200 also includes adapter 212 and adapter 214. Secondary IOPs 216 and 218 are intelligent adapters under $I_2O$ and contain input/output processors. Adapters 212 and 214 are non-intelligent adapters, which do not contain input/output processors. The processes and apparatus of the present invention may be implemented in the various adapters and IOPs in data processing system 200.

Figure 3:
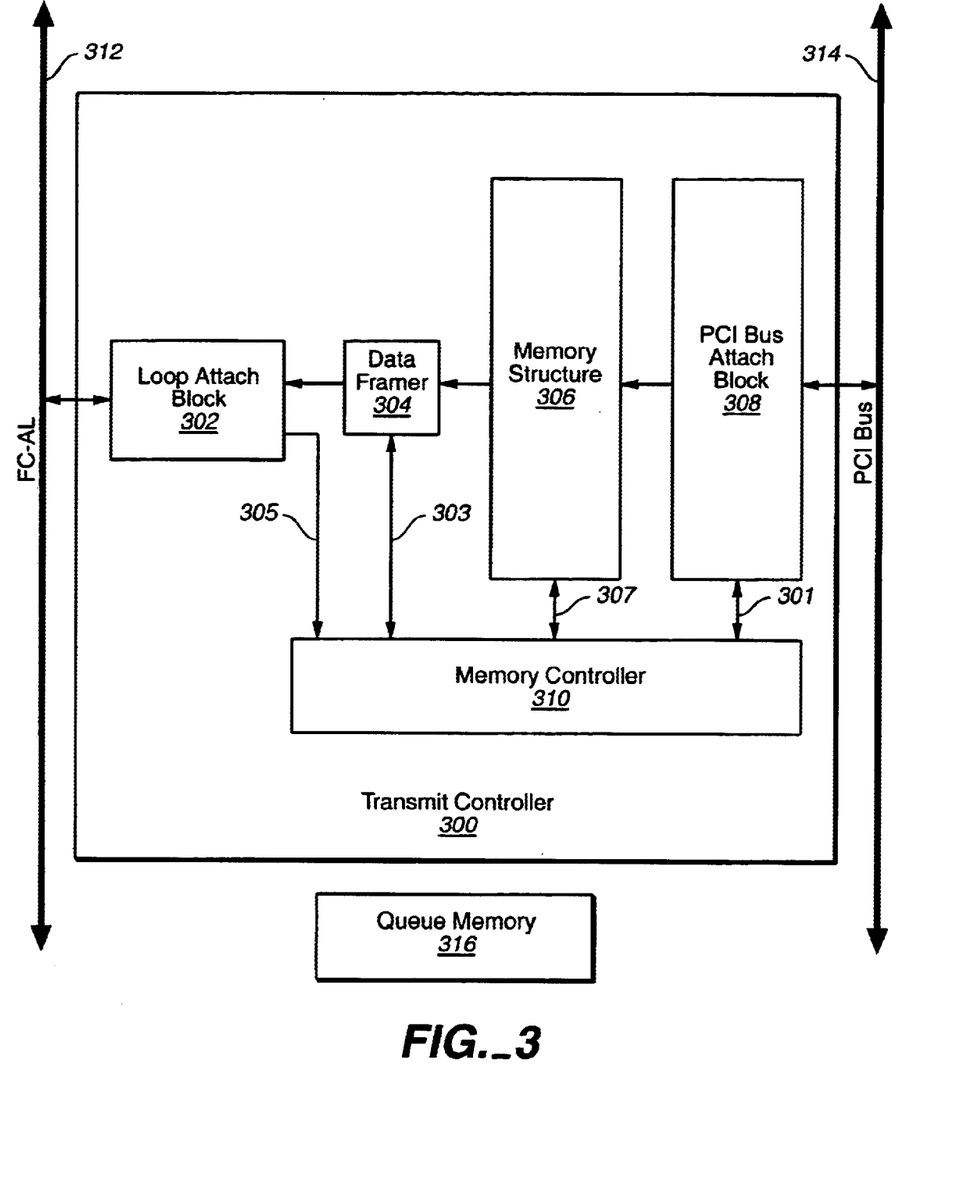
FIG. 3 is a block diagram of a transmit controller used to transfer data in accordance with a preferred embodiment of the present invention.

Turning now to FIG. 3, a block diagram of a transmit controller used to transfer data is depicted in accordance with a preferred embodiment of the present invention. Transmit controller 300 is an example of a transmit controller that may be found within an IOP or an adapter in a data processing system, such as data processing system 200 in FIG. 2. Transmit controller 300 may be implemented in a number of ways, such as, for example, as an application specific integrated circuit (ASIC). Transmit controller 300 includes a loop attach block 302, a data framer 304, a memory structure 306, a PCI bus attach block 308, and a memory controller 310. Loop attach block 302 is an interface that provides a connection to a Fibre Channel fabric 312 to transmit and receive data from Fibre Channel fabric 312. In the depicted example, Fibre Channel fabric 312 is a Fibre Channel arbitrated loop. Loop attach block 302 provides 8 b/10 b encode/decode functions and reorders bytes in the appropriate manner to be compatible with an external serializer/deserializer. The external serializer/deserializer (SERDES) converts the data between the serial differential pair bit stream used by Fibre Channel 312 and the parallel data used by loop attach block 302. Data framer 304 is responsible for routing data from memory structure 306 and adding any required information to generate a frame for transfer onto Fibre Channel 312. A frame is the smallest indivisible packet of data that is sent onto a Fibre Channel system. Depending on the type of network used, data framer 304 may create other types of frames or data packets.

Figure 4:
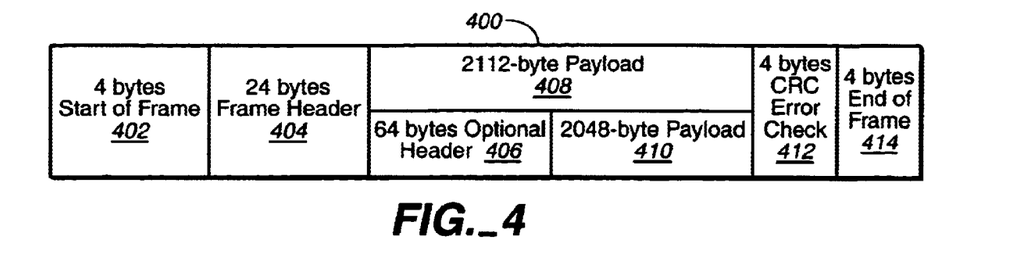
FIG. 4 is a diagram of a frame handled by the present invention.

Turning to FIG. 4, a diagram of a frame handled by the present invention is illustrated. Frame 400 includes a start of frame delimiter 402, a frame header 404, an optional header 406, along with payloads 408 and 410. Frame 400 also includes a 32 bit CRC 412 for error detection and an end of framer delimiter 414. In the depicted example, each frame or group of frames is acknowledged when received by a target node. This acknowledgement also provides notification of non-delivery of a frame to a target node. Reception of a frame may be acknowledged depending on what is called the "class of service". Class 1 service and 2 service provide for an acknowledgement called an "ACK". Class 3 service (the most popular as of today) does not provide for such an acknowledgement. For this class, it is up to the protocol using the Fibre Channel connection to provide a method to determine if data was successfully delivered. A node does provide a signal called an R_RDY to indicate when it has cleared a buffer and is able to receive another frame. The only indication that no buffers are available is the lack of this signal.

Turning back to FIG. 3, memory structure 306 contains the data that is to be transferred to various destination nodes on the Fibre Channel arbitrated loop. PCI bus attach block 308 is employed to pass information across PCI bus 314. Memory controller 310 contains the processes and logic of the present invention used to intelligently transfer data and manage memory structure 306.

Memory controller 310 begins the transfer of data to a target node by sending the appropriate signals to PCI bus attach block 308 through PCI load control line 301 to load data from a host memory on PCI bus 314. The data is loaded into memory structure 306. Thereafter, memory controller 310 sends a start instruction to data framer 304 through start/abort control line 303 to route data to the appropriate target node. Memory structure 306 may be divided into a number of different buffers in which data to be transferred to a target node is to be stored. In the depicted example, memory structure 306 is configured to be large enough to store pre-loaded transmission data in a manner that deletion of this data is avoided when the transmission of data is not possible due to a lack of received buffers or fill-received buffers on a target node. Of course, the various buffers within memory structure 306 need not be contiguous. When the transfer of a set of data is not possible because the destination, a target node, is not receiving data, additional data may be loaded into a different location in memory structure 306 destined for a different node. In the depicted example, the additional data may be loaded into another buffer allocated within memory structure 306. A queue memory 316 is present for storing transfer requests. Queue memory 316 could be located on chip, off chip but on the adapter board, or in host memory. Queue memory 316 is simply a shared storage element (in this case a memory region) accessible by the processor generating the transfer requests and memory controller 310. A common data structure is defined to allow transfer requests to be communicated between the two processing elements.

Figure 5:
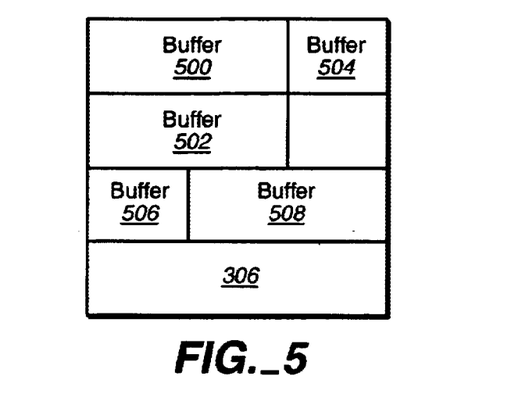
FIG. 5 is a diagram illustrating allocation of buffers in a memory structure in accordance with a preferred embodiment of the present invention.

Turning next to FIG. 5, a diagram illustrating allocation of buffers in a memory structure is depicted in accordance with a preferred embodiment of the present invention. As can be seen, memory structure 306 includes buffers 500–508. Each of these buffers is allocated for a set of data, such as frames for transmission to a target node. In this example, five sets of data are stored within memory structure 306. Although the buffers shown in memory structure 306 are shown as contiguous blocks of memory, contiguous allocation of memory for a buffer is not required. Each of the sets of data are destined for a particular node on a Fibre Channel arbitrated loop. Memory controller 310 directs the order in which these sets of data are transmitted to the target nodes. Data may be loaded for a new transfer each time a target node is not accepting data. Alternatively, multiple sets of data may be loaded into memory structure 306 for transfer based on various mechanisms, such as a priority scheme or a round robin scheme. All currently loaded data may be scanned until a node is found that has the capacity to receive the data or is held idle as above in the Fibre Channel fabric. Previously, when a destination node was not receiving data, the information in the buffer was unloaded and another set of data destined for another node was loaded for transmission. In the depicted example, the set of data for a particular node is retained within memory structure 306, while memory controller 310 loads a new set of data destined for another node into a buffer in memory structure 306. When multiple sets of data are located within memory structure 306, memory controller 310 may scan the Fibre Channel fabric to decide which node may receive data. In scanning the Fibre Channel fabric for a node to accept data, different strategies may be employed depending on the implementation. One strategy involves proceeding through a list of nodes and attempting to send data to each node on the list in the order encountered. Another strategy involves using a round robin process for selecting nodes for data transfer.

When transfer of data begins, memory controller 310 sends a start signal to data framer 304 through start/abort control line 303 to begin transferring data from memory structure 306 to loop attach block 302 for ultimate transfer onto the Fibre Channel fabric. Memory controller 310 will halt the transfer of data to a particular node on the Fibre Channel in response to receiving a blocked indicator from loop attach block 302 through block indicator line 305. In response to such a signal, memory controller 310 will send an abort control signal to data framer 304 to stop transfer of data. Memory controller 310 also will send load signals to PCI bus attach block 308 to initiate the loading of additional sets of data in response to the set of data being sent to the destination node or in response to an inability to transfer data to the destination node. Memory controller 310 selects the various sets of data for transfer in memory structure 306 through various buffer selection signals sent on buffer selection line 307.

Figure 6:
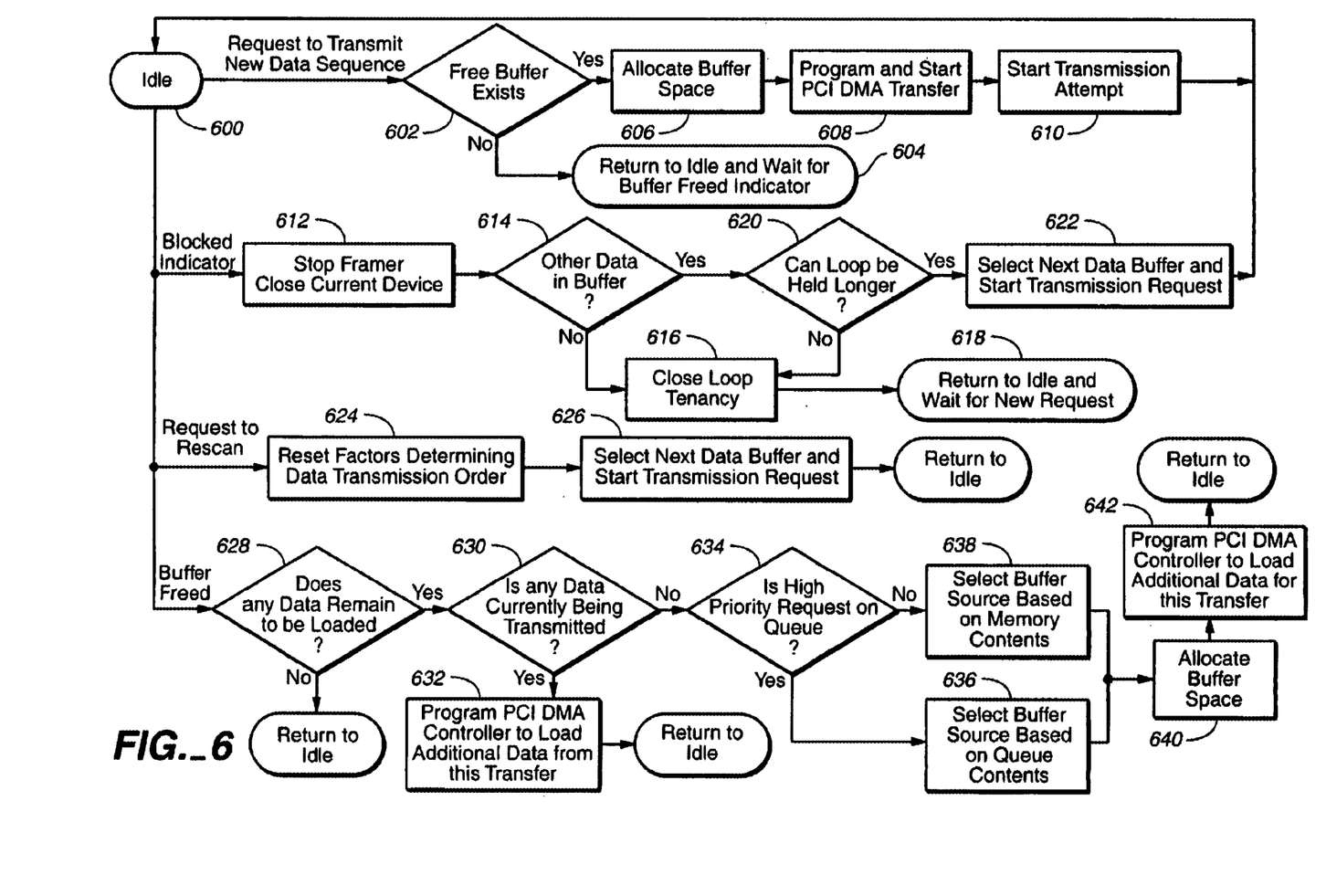
FIG. 6 is a flowchart of a process for managing a buffer in a node in accordance with a preferred embodiment of the present invention.

With reference now to FIG. 6, a flowchart of a process for managing a buffer in a node is depicted in accordance with a preferred embodiment of the present invention. The process in FIG. 6 illustrates the process in states and steps employed by memory controller 310 in transferring data to target nodes on a Fibre Channel arbitrated loop. The process begins in an idle state 600 waiting for a signal. In response to receiving a request to transmit a new data sequence, a determination is made as to whether free buffer space exists in the memory structure (step 602). If free buffer space does not exist in the memory structure, the process return to the idle state 600 and waits for a buffer freed indicator (step 604). Otherwise, buffer space is allocated in the memory structure (step 606), and program and start PCI DMA transfer occurs (step 608). A program and start direct memory access (DMA) request consists of obtaining a scatter/gather list element from the transfer request data structure in the queue memory and providing it to the PCI bus attach block 308. (A scatter/gather list consists of a set of address/byte-count pairs that completely describe the memory location(s) from which data for the transfer is to be obtained. A start signal is then sent to the PCI bus attach block 308 indicating that the DMA programming is complete and the PCI bus attach block 308 may execute the data transfer. Thereafter, a start transmission attempt is made (step 610) with the process then returning to idle state 600. A start transmission request is a simple handshake indicating to data framer 308 that the correct data is located in the memory structure and that all other information required for the data framer 308 to build the proper frames has also been programmed into data framer 308 by memory controller 310. The result of this step is a request sent to loop attach block 302 to send the frame.

In response to receiving a blocked indicator, data framer 304 is stopped and the current device is closed (step 612). In this step, the memory controller sends a stop signal to the framer to stop sending data on to the Fibre Channel fabric. In addition, the current device is closed. Closing a "device", also called "CLS", refers to a signal being sent to the target node to indicate that no further data is to be sent. The target node will then acknowledge this by repeating the CLS itself At this time, the source node may open another target node. Then, a determination is made as to whether other data is stored in the buffer (step 614). If other data is not stored in the buffer, then close loop tenancy is performed (step 616). Tenancy refers to the period of time from a node achieving successful arbitration to the time the node no longer needs the loop (i.e. other nodes may win arbitration). Closing the loop refers to the situation in which a node no longer desires to open another target node and will allow another node to win arbitration and use the loop if so desired. In this step, the loop is released. Thereafter, the process returns to idle and waits for a new request (step 618). A transmit new data request may also be received. (i.e. the controller may continue to load new data if buffers are available even though it is not currently transmitting data).

With reference again to step 614, if other data is stored in the buffers in memory structure 306, a determination is made as to whether the loop can be continued to be held by the node (step 620). The decision in step 620 may be based on the likelihood that more data can be sent, the time the loop has already been held, and other factors depending on the implementation. For example, after a single attempt to send each buffer once, attempts may be stopped. Alternatively, attempts to transfer data may be made in a round robin order for a set period of time before the loop is released. All high priority traffic may be continuously attempted until sent, then a low priority attempt is sent. If the loop cannot be continued to be held, the process then proceeds to step 616 to release the loop. Otherwise, the next data in the buffer in memory structure 306 is selected for transfer and a start transmission request is made (step 622). The selection of the next data buffer in memory structure 306 may be based on a number of different mechanisms. For example, the next data buffer may be selected based on the number of attempts already made to send data to the buffer, the priority of buffer traffic and other factors. The selection may be made in the order of queuing or on some priority order associated with each set of data. In addition, the selection also may be based on the total number of buffers in memory structure 306. The process then returns to the idle state 600.

In response to receiving a request to rescan, factors determining data transmission order are reset (step 624). Then, the next data buffer is selected and a start transmission request is made (step 626) with the process returning to the idle state 600.

In response to receiving a buffer freed signal, a determination is made as to whether data remains to be loaded into memory structure 306 (step 628). If data does not remain to be loaded, the process then returns to idle state 600. Otherwise, a determination is made as to whether data is currently being transmitted (step 630). If data is currently being transmitted, then the PCI DMA controller is programmed to load additional data for this transfer (step 632) with the process then returning to the idle state 600.

With reference again step 630, if data is not currently being transmitted, a determination is then made as to whether a high priority request is located on the queue (step 634). If a high priority request is located on a queue then, a buffer source is selected based on the queue contents (step 636). If a high priority request is not located on the queue, then a buffer source is selected based on the memory contents (step 638). In both instances, buffer space in memory structure 306 is allocated after a buffer source is selected (step 640). Thereafter, the PCI Bus Attach block is programmed to load the additional data for the transfer (step 642) with the process then returning to idle state 600.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application and to enable others of ordinary skill in the art to understand the invention for various embodiments with various modifications as are suited to the particular use contemplated. While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
    an interface configured for connection to a bus;
    a memory connected to the interface;
    a controller connected to the memory, wherein the controller has a plurality of modes of operation including:
        a first mode of operation in which the controller is idle and monitors for signals;
        a second mode of operation, responsive to detecting a request to transmit data signal in the first mode of operation, in which the controller allocates a first buffer space in the memory for a first data transfer, loads a first set of data into the first buffer space in the memory, and begins the data transfer;
        a third mode of operation, responsive to receiving a blocked indication, in which the controller halts the data transfer, determines if a second set of data is available for transfer;
        a fourth mode of operation, responsive to another set of data being present in the memory, in which the memory controller allocates a second buffer space for a second data transfer, loads the second set of data to the second buffer space, and begins the second data transfer.

2. The apparatus of claim 1, wherein other data is present in another buffer and wherein the controller further includes:
    a fifth mode of operation, responsive to detecting a request to rescan in the first mode of operation, in which the controller selects the another buffer for transmission and begins transmission of the other data.

3. The apparatus of claim 1, wherein the interface is a first interface, the memory is connected to a second interface, the controller loads the second set of data from the second interface.

4. The apparatus of claim 3, wherein the second interface is configured for connection to a peripheral connect interface.

5. The apparatus of claim 1, wherein the first interface is configured for connection to a Fibre Channel arbitrated loop.

6. The apparatus of claim 1, wherein the memory is connected to the interface by a data framer, which creates frames from the data for the data transfer.

7. An apparatus comprising:

an interface configured for connection to a bus;

a memory connected to the interface;

a controller connected to the memory, wherein the controller has a plurality of modes of operation including:

a first mode of operation in which the controller is idle and monitors for signals;

a second mode of operation, responsive to detecting a request to transmit data signal in the first mode of operation, in which the controller determines whether space is present in the memory and allocates a first buffer space in the memory for a first data transfer, loads a set of data corresponding the request into a buffer space in the memory, and begins the data transfer; and a third mode of operation, responsive to a receiving a blocked indication while a data transfer is occurring, in which the controller halts the data transfer, determines if another set of data is available for transfer and begins another data transfer using the another set of data.

8. The apparatus of claim 7, wherein other data is present in another buffer and wherein the controller further includes:

a fifth mode of operation, responsive to detecting a request to rescan in the first mode of operation, in which the controller selects the another buffer for transmission and begins transmission of the other data.

9. The apparatus of claim 7, wherein the interface is a first interface, the memory is connected to a second interface, the controller loads the second set of data from the second interface.

10. An apparatus comprising:

an interface configured for connection to a bus;

a memory connected to the interface;

a controller connected to the memory, wherein the controller has a plurality of modes of operation including:

a first mode of operation in which the controller is idle and monitors for signals;

a second mode of operation, responsive to detecting a request to transmit data signal in the first mode of operation, in which the controller determines whether space is present in the memory and allocates a first buffer space in the memory for a first data transfer, loads a set of data corresponding the request into a buffer space in the memory, and begins the data transfer; and a third mode of operation, responsive to receiving a blocked indication while a data transfer is occurring, in which the controller halts the data transfer, determines if another set of data is available for transfer and begins another data transfer using the another set of data, wherein other data is present in another buffer and wherein the controller further includes:

a fifth mode of operation, responsive to detecting a request to rescan in the first mode of operation, in which the controller selects the another buffer for transmission and begins transmission of the other data, and wherein the memory controller further includes:

a sixth mode of operation, responsive to receiving an indication that a buffer is free in the memory, in which the memory controller determines whether any data is present for loading; responsive to data being present for loading, determines whether a data transfer is occurring; and responsive to a determination that data transfer is not occurring allocates a buffer in the memory for the any data to form an allocated buffer; and loads the any data into the allocated buffer.

11. The apparatus of claim 10, wherein in the sixth mode of operation the controller assigns a priority to the allocated buffer with respect to other buffers containing data for transfer.

12. The apparatus of claim 11, wherein the bus is a Fibre Channel arbitrated loop.

* * * * *